US012706982B2

(12) United States Patent
Ding et al.

(10) Patent No.: US 12,706,982 B2
(45) Date of Patent: Aug. 11, 2026

(54) INFORMATION PROCESSING METHOD AND APPARATUS, AND DEVICE

(71) Applicant: Beijing Youzhuju Network Technology Co., Ltd., Beijing (CN)

(72) Inventors: Hao Ding, Beijing (CN); Weimin Li, Beijing (CN); Jianhua Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 229 days.

(21) Appl. No.: 18/263,260

(22) PCT Filed: Feb. 21, 2022

(86) PCT No.: PCT/CN2022/077144
§ 371 (c)(1),
(2) Date: Jul. 27, 2023

(87) PCT Pub. No.: WO2022/188615
PCT Pub. Date: Sep. 15, 2022

(65) Prior Publication Data

US 2024/0114079 A1 Apr. 4, 2024

(30) Foreign Application Priority Data

Mar. 11, 2021 (CN) ......................... 202110268101.7

(51) Int. Cl.
*G06Q 30/00* (2023.01)
*H04L 67/54* (2022.01)
(Continued)

(52) U.S. Cl.
CPC .............. *H04L 67/55* (2022.05); *H04L 67/54* (2022.05); *G06Q 30/0601* (2013.01)

(58) Field of Classification Search
CPC ................................................ G06Q 30/06–08
See application file for complete search history.

(56) References Cited

U.S. PATENT DOCUMENTS

2014/0244504 A1 8/2014 Owen
2016/0308748 A1* 10/2016 Zuo ........................ H04W 24/04
2017/0332240 A1* 11/2017 Raleigh ............ H04W 72/0453

FOREIGN PATENT DOCUMENTS

CN 105933266 A 9/2016
CN 106134163 A 11/2016
(Continued)

OTHER PUBLICATIONS

Machine translation of CN 110636459 downloaded from espacenet.com (Year: 2019).*
(Continued)

*Primary Examiner* — Ethan D Civan
(74) *Attorney, Agent, or Firm* — Alleman Hall LLP

(57) ABSTRACT

Embodiments of the present disclosure provide an information processing method and apparatus, and a device, the method includes: sending an information request to a platform side at a preset time interval if it is determined that a merchant platform application has been logged in; receiving a system message sent by the platform side in response to the information request in real time, where the system message is sent by a service side to the platform side in real time; and displaying the system message and/or prompt information of the system message on the merchant platform application. This embodiment does not require the merchant to obtain a new system message by refreshing a page, avoiding a repeated refresh operation by the merchant and avoiding the merchant missing an important notification due to not being able to obtain the system message in time.

19 Claims, 5 Drawing Sheets

(51) Int. Cl.

| | |
|---|---|
| ***H04L 67/55*** | (2022.01) |
| *G06Q 30/0601* | (2023.01) |

(56) References Cited

FOREIGN PATENT DOCUMENTS

| | | | |
|---|---|---|---|
| CN | 108897631 | A | 11/2018 |
| CN | 110636459 | A | 12/2019 |
| CN | 110932924 | A | 3/2020 |
| CN | 112927020 | A | 6/2021 |

OTHER PUBLICATIONS

Han, S., et al., “Experimental Evaluation of Behavior-Based Failure-Detection Schemes in Real-Time Communication Networks”, IEEE Transactions on Parallel and Distributed Systems, vol. 10, No. 6, pp. 613-626, Jun. 1999 (Year: 1999).*

China National Intellectual Property Administration, International Search Report and Written Opinion Issued in Application No. PCT/CN2022/077144, Mar. 5, 2022, WIPO, 12 pages.

China National Intellectual Property Administration, Office Action and Search Report Issued in Application No. 202110268101.7, Nov. 11, 2022, 19 pages.

China National Intellectual Property Administration, Office Action and Search Report Issued in Application No. 202110268101.7, May 10, 2023, 11 pages. Submitted with partial English translation.

China National Intellectual Property Administration, Office Action and Search Report Issued in Application No. 202110268101.7, Apr. 21, 2026, 20 pages.

Kamal, R et al., “Introduction to the Internet of Things,” McGraw-Hill, Nov. 2019, 42 pages.

* cited by examiner

Notification of successful opening for freight insurance xxxxxxxxxx,xxxxxxxxxxx

FIG. 3
FIG. 4
The store has been closed for rectification
Your store has been closed for rectification due to the reasons xx

1/2

Processing

Processing later

INFORMATION PROCESSING METHOD AND APPARATUS, AND DEVICE

CROSS-REFERENCE TO RELATED APPLICATIONS

The present application is a National Stage of International Application No. PCT/CN2022/077144, filed on Feb. 21, 2022, which claims priority to Chinese Patent Application No. 202110268101.7, filed on Mar. 11, 2021, both of the applications are incorporated herein by reference in their entireties.

TECHNICAL FIELD

Embodiments of the present disclosure relate to a field of information and computer technology, and in particular, to an information processing method and apparatus, and a device.

BACKGROUND

With the continuous development of e-commerce and network technology, various e-commerce systems provide technical support for merchants to operate online store management. In the e-commerce system, the merchant side usually needs to receive various system messages related to merchant operations, sales, management, etc. sent by the service side, and the merchant manages the online store based on these messages.

At present, in the traditional process of information interaction between the merchant side and the service side, the merchant usually refreshes the page on the user side and obtains the system message sent by the service side through a corresponding message interface between the user side and the service side.

However, in a traditional information processing process, if the merchant fails to refresh the page for a long time, the merchant side will not be able to obtain any system messages, which will cause the merchant to miss important notifications with timeliness.

SUMMARY

Embodiments of the present disclosure provide an information processing method and apparatus, and a device that may overcome the problem in the traditional information processing process that the merchant would miss important notifications with timeliness since the merchant side will not be able to obtain any system messages if the merchant fails to refresh the page for a long time.

In a first aspect, an embodiment of the present disclosure provides an information processing method, including:

- sending an information request to a platform side at a preset time interval if it is determined that a merchant platform application has been logged in;
- receiving a system message sent by the platform side in response to the information request in real time, where the system message is sent by a service side to the platform side in real time; and
- displaying the system message and/or prompt information of the system message on the merchant platform application.

In a second aspect, an embodiment of the present disclosure provides an information processing method, including:

- receiving an information request sent at a preset time interval by a merchant side after the merchant side logs into a merchant platform application;
- receiving a system message sent by a service side in real time, and determining display mode information of the system message; and
- sending the system message to the merchant side in response to the information request, where the system message includes the display mode information to enable the merchant side to display the system message and/or prompt information of the system message on the merchant platform application according to the display mode information.

In a third aspect, an embodiment of the present disclosure provides an information processing apparatus, including:

- a first sending module, configured to send an information request to a platform side at a preset time interval if it is determined that a merchant platform application has been logged in;
- a first receiving module, configured to receive a system message sent by the platform side in response to the information request in real time, where the system message is sent by a service side to the platform side in real time; and
- a display module, configured to display the system message and/or prompt information of the system message on the merchant platform application.

In a fourth aspect, an embodiment of the present disclosure provides an information processing apparatus, including:

- a second receiving module, configured to receive an information request sent at a preset time interval by a merchant side after the merchant side logs into a merchant platform application;
- a third receiving module, configured to receive a system message sent by a service side in real time, and determine display mode information of the system message; and
- a second sending module, configured to send the system message to the merchant side in response to the information request, where the system message includes the display mode information to enable the merchant side to display the system message and/or prompt information of the system message on the merchant platform application according to the display mode information.

In a fifth aspect, an embodiment of the present disclosure provides an electronic device, including: a processor and a memory;

- where the memory has a computer-executable instruction stored therein;
- the processor executes the computer-executable instruction stored in the memory to enable the at least one processor to perform the information processing method described in the first aspect above.

In a sixth aspect, an embodiment of the present disclosure provides an electronic device, including: a processor and a memory;

- where the memory has a computer-executable instruction stored therein;
- the processor executes the computer-executable instruction stored in the memory to enable the at least one processor to perform the information processing method described in the second aspect above.

In a seventh aspect, an embodiment of the present disclosure provides a computer readable storage medium storing a computer-executable instruction, when the computer-executable instruction is executed by a processor, the information processing method described in the first aspect above is implemented.

In an eighth aspect, an embodiment of the present disclosure provides a computer readable storage medium storing a computer-executable instruction, when the computer-executable instruction is executed by a processor, the information processing method described in the second aspect above is implemented.

In a ninth aspect, an embodiment of the present disclosure provides a computer program product including a computer program, when the computer program is executed by a processor, the information processing method described in the first aspect above is implemented.

In a tenth aspect, an embodiment of the present disclosure provides a computer program product including a computer program, when the computer program is executed by a processor, the information processing method described in the second aspect above is implemented.

In an eleventh aspect, an embodiment of the present disclosure provides a computer program, when the computer program is executed by a processor, the information processing method described in the first aspect above is implemented.

In a twelfth aspect, an embodiment of the present disclosure provides a computer program, when the computer program is executed by a processor, the information processing method described in the second aspect above is implemented.

The embodiments provide an information processing method and apparatus, and a device, where the method includes: sending an information request to a platform side at a preset time interval if it is determined that a merchant platform application has been logged in; receiving a system message sent by the platform side in response to the information request in real time; and displaying the system message and/or prompt information of the system message on the merchant platform application. This embodiment does not require the merchant to refresh a page to obtain a new system message, avoiding a repeated refresh operation by the merchant and avoiding the merchant missing an important notification due to not being able to obtain the system message in time.

BRIEF DESCRIPTION OF DRAWINGS

In order to illustrate the embodiments of the present disclosure or the technical solutions in the related art more clearly, the following briefly introduces the accompanying drawings that need to be used in the description of the embodiments or the related art. Obviously, the accompanying drawings in the following description are some embodiments of the present disclosure, and for those of ordinary skill in the art, other accompanying drawings may also be obtained from these accompanying drawings without any creative work.

DESCRIPTION OF EMBODIMENTS

In order to make the purposes, technical solutions and advantages of the embodiments of the present disclosure more clear, the technical solutions in the embodiments of the present disclosure will be described clearly and completely below in combination with the accompanying drawings in the embodiments of the present disclosure. Obviously, the described embodiments are part of the embodiments of the present disclosure, not all of them. Based on the embodiments in the present disclosure, all other embodiments obtained by an ordinary person skilled in the art without paying creative work all belong to the protection scope of the present disclosure.

At present, in the existing e-commerce system, the merchant side usually uses a message interface to obtain the system message, without a mechanism for actively pushing system messages. Instead, the merchant side needs to trigger an operation of refreshing a page before calling the message interface to obtain the system message. However, in this case, if the merchant does not operate or refresh the page for a long time, the merchant may not be able to obtain any system messages in the merchant side, which may cause the system message to be sent untimely, and easily cause the merchant to miss the important notification.

In order to solve the above problems, an embodiment of the present disclosure provides an information processing method, including: after a merchant logs in a merchant platform, sending an information request to a platform side at a preset time interval, receiving a system message sent by the platform side in response to the information request in real time, and displaying the system message and/or prompt information on the merchant platform application. There is no need for the merchant to obtain a new system message by refreshing a page, avoiding a repeated refresh operation by the merchant and avoiding lagging timeless for obtaining the system message by the merchant.

Figure 1:
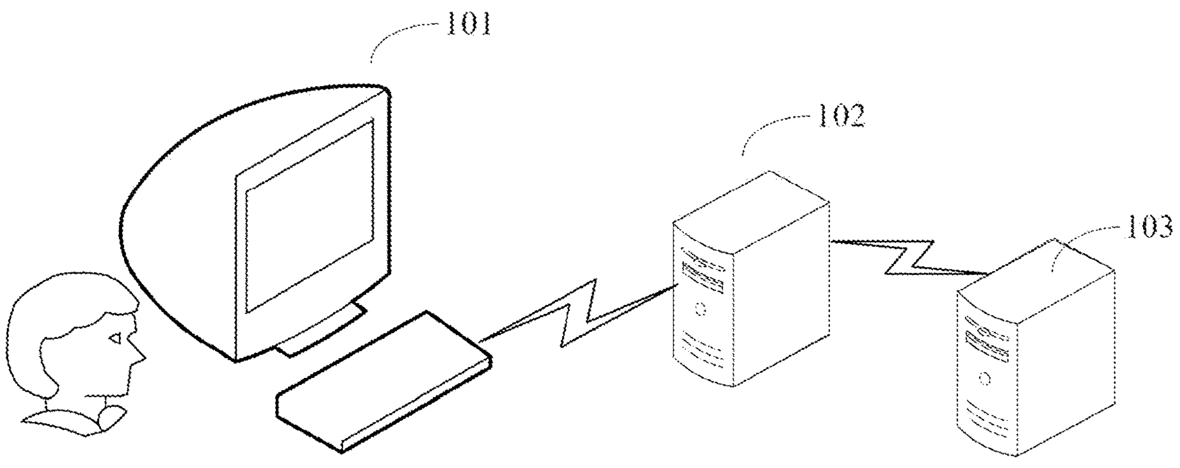
FIG. 1 is a schematic diagram of an e-commerce system architecture provided by an embodiment of the present disclosure.

Referring to FIG. 1, which is a schematic diagram of an e-commerce system architecture provided by an embodiment of the present disclosure. In FIG. 1, the e-commerce system includes a merchant side 101, a platform side 102 and a service side 103. Here, the merchant side 101, the platform side 102 and the service side 103 establish a communication connection via a wired network or a wireless network. Various system messages related to merchant operations, sales, management, etc. sent by the service side 103 to the platform side 102, which forwards the system message to the merchant side 101. There is a merchant platform application (App of the merchant platform) installed on the merchant side 101, through which the merchant receives the system message, and the merchant manages, operates and sells the merchant online shop on the merchant platform according to the system message.

It should be noted that the merchant side 101 may be any form of terminal device, and the terminal device referred to in the present disclosure may be a wireless terminal or a wired terminal. The wireless terminal can be a device that provides voice and/or other business data connectivity to a user, a handheld device with a wireless connectivity capability, or other processing devices connected to a wireless modem. The wireless terminal can communicate with one or more core network devices through a radio access network (RAN), the wireless terminal can be a mobile terminal, such as a mobile phone (or a "cellular" phone) and a computer with a mobile terminal, such as a portable, pocket, handheld, computer built-in, or car mounted mobile device that exchange language and/or data with the wireless access network. For another example, the wireless terminal can also be a personal communication service (PCS) phone, a cordless telephone, a session initiation protocol (Session Initiation Protocol, SIP) phone, a wireless local loop (WLL) station, a personal digital assistant (PDA) and other devices. The wireless terminal can also be referred to as a system, a subscriber unit, a subscriber station, a mobile station (Mobile), a remote station, a remote terminal, an access terminal, a user terminal, a user agent, a user devices (User Device or User Equipment), which is not limited here. In an implementation, the above terminal device may also be a device such as a smart watch, tablet, etc. The platform side 102 and the service side 103, both of which can be a single server or a cluster of multiple servers.

Figure 2:
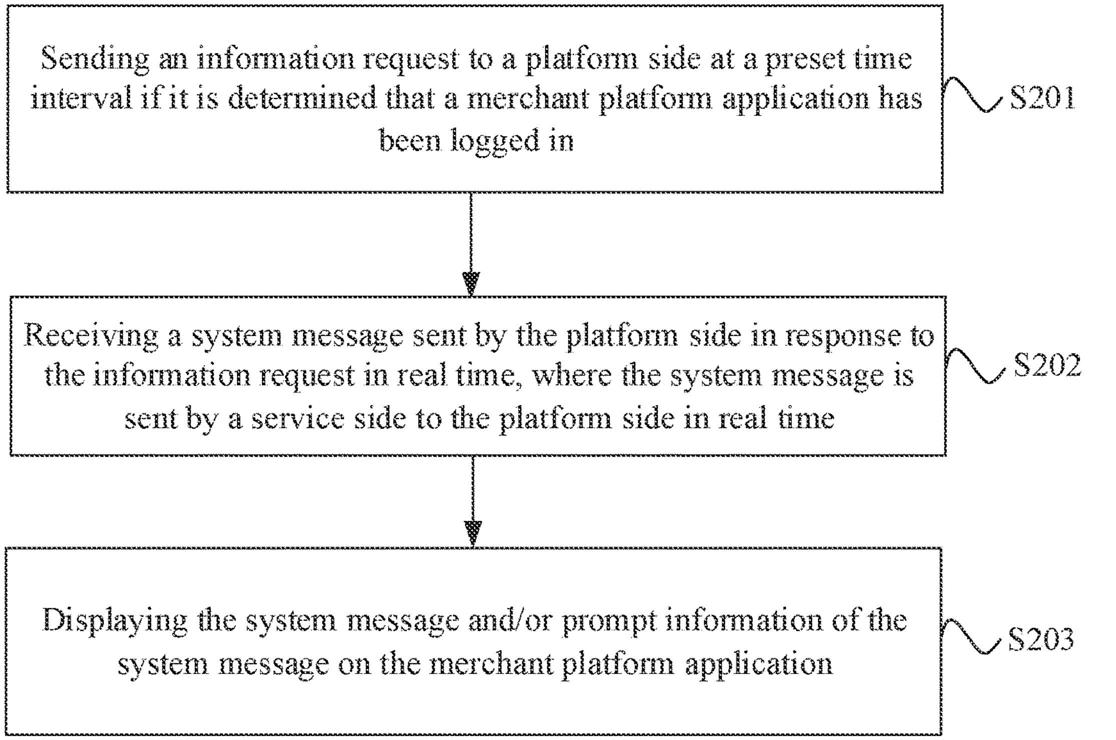
FIG. 2 is a first flow schematic diagram of an information processing method provided by an embodiment of the present disclosure.

Reference to FIG. 2, which is a first flow schematic diagram of an information processing method provided by an embodiment of the present disclosure. The method of this embodiment can be applied to the merchant side shown in FIG. 1, the information processing method includes the following steps.

S201: sending an information request to a platform side at a preset time interval if it is determined that a merchant platform application has been logged in.

Specifically, the merchant enters login information (account number, password; or fingerprint information, etc.) into the merchant platform application in the merchant side, and the merchant side sends the login information to the service side (the merchant side can directly send the login information to the service side, or send the login information to the service side through the platform side); after verifying and passing the login information, the service side returns the confirmed login information to the merchant platform application of the merchant side, it is completed that the merchant login to the merchant platform application in the merchant side.

In an implementation, the preset time interval may be set based on a timeliness need for obtaining information by the merchant, for example, the preset time interval is 10 seconds or 5 seconds.

In the present embodiment, the information request may contains identity information of the merchant or device information of the merchant side.

S202: receiving a system message sent by the platform side in response to the information request in real time, where the system message is sent by a service side to the platform side in real time.

Specifically, the platform side may query the system message corresponding to the merchant or the merchant side according to the identity information of the merchant or the device information of the merchant side contained in the information request, and send the system message to the merchant corresponding to the identity information of the merchant or the device information of the merchant side.

In the present embodiment, the service side may create a system message according to an operation status of the merchant or a need of the administrator, the system message needs to be sent to the merchant side to make the merchant of the merchant side aware of the system message and use the system message for operation, sales, management and other related business processing.

The service side may send the system messages to the platform side in real time.

S203: displaying the system message and/or prompt information of the system message on the merchant platform application.

In the embodiment of the present disclosure, it is possible to display only the system message or the prompt information of the system message on the merchant platform application, or to simultaneously display the system message and the prompt information of the system message on the merchant platform application.

The displaying of the prompt information of the system message may be to display a preset copywriting or to display a part of the system message. When displaying a part of the system message, it may be to display a certain number of characters (e.g. 50 characters) starting from the starting character of the system message.

It should be noted that if the merchant does not log in to the merchant platform in merchant side, the service side also sends the system message to the platform side. However, at this time, the platform side does not send the system message to the merchant side, but saves these system messages. After the merchant logs in to the platform side, the platform side sends the saved system message to a preset message control of the merchant platform application for saving. At this time, the merchant platform application does not display the system message and/or the prompt information of the system message to reduce the impact on the merchant. When the user triggers the preset message control, the merchant platform application displays a list of these system messages.

It can be seen from the above description that an information request is sent to a platform side at a preset time interval if it is determined that a merchant platform application has been logged in, a system message sent by the platform side in response to the information request is received in real time, and the system message and/or prompt information of the system message is displayed on the merchant platform application. This embodiment does not require the merchant to refresh a page to obtain a new system message, avoiding a repeated refresh operation by the merchant and avoiding the merchant missing an important notification due to not being able to obtain the system message in time.

In an embodiment of the present disclosure, on the basis of the above embodiment, the system message includes display mode information; in step S203 above, the displaying the system message and/or the prompt information of the system message on the merchant platform application, specifically includes:

displaying, according to the display mode information, the system message and/or the prompt information of the system message on the merchant platform application.

In the embodiment of the present disclosure, the display mode information may be a label added to the system message.

Specifically, through the label, the corresponding relationship between the preset label and the display mode may be queried, and the corresponding display mode of the label may be found, and the system message and/or the prompt information of the system message is displayed in the display mode corresponding to the label.

It can be seen from the above description that, the system message or the prompt information of the system message is displayed in the respective display mode by adding the display mode information to the system message, to achieve the purpose of achieving different levels of reminders for the merchant.

In an embodiment of the present disclosure, on the basis of the above embodiment, the display mode information is importance level information of the system message, and the importance level information is determined according to a content type of the system message; specifically, the displaying, according to the display mode information, the system message and/or the prompt information of the system message on the merchant platform application includes:

S301: identifying the importance level information of the system message, and determining a display mode corresponding to the importance level information of the system message.

In the embodiment of the present disclosure, the system message includes the importance level information, scanning a preset field of the system message to obtain the corresponding importance level information.

In the embodiment of the present disclosure, the importance level information of the system message may be divided into several levels according to the content type of the system message, and the determined importance level information may be added to the preset field of each system message.

Specifically, by querying the importance level information, the display mode corresponding to the importance level information of the system message is found by querying the corresponding relationship between the importance level and the display mode.

S302: displaying the system message and/or the prompt information of the system message in the display mode corresponding to the importance level information of the system message.

In the embodiment of the present disclosure, the merchant is reminded in different display modes according to the importance level of the system message, so that the merchant know the importance level of different system messages, which allows the merchant to choose whether to process the system message immediately, later, or without processing.

It can be seen from the above description that the display mode information added to the system message is the importance level information, and the importance level information is determined according to the content type of the system message, different display modes are used to remind the merchant according to the different importance levels of the system messages, so that the merchant may know the importance level of different system messages and adopt different processing methods.

In an embodiment of the present disclosure, on the basis of the above embodiment, in step S302 above, the displaying the system message and/or the prompt information of the system message in the display mode corresponding to the importance level information of the system message, specifically includes:

S3021: displaying the prompt information of the system message in a forced pop-up window mode on the merchant platform application if the system message is a first important level information.

In the embodiment of the present disclosure, through a forced pop-up window mode, the system message is displayed to the merchant in a relatively strengthened interactive manner to achieve the effect of the most important information is emphatically reminded.

The system message is the first important level information, which is the important emergency level information, and refers to a system message related to blocking store operations of the merchant (such as contract signing) and major business activities within the company (such as the New Year's Goods Festival).

Figures 3, 4:
FIG. 3 is a schematic diagram of forced pop-up window display of a system message provided by an embodiment of the present disclosure.
FIG. 4 is a schematic diagram of resident floating layer display of a system message provided by an embodiment of the present disclosure.

It should be noted that the forced pop-up window mode may be in various styles, such as size, color, etc., which can be set as needed. Reference to FIG. 3, which is a schematic diagram of forced pop-up window display of a system message provided by an embodiment of the present disclosure. As shown in FIG. 3, a complete system message, an operation entry, and a close button may be displayed on the forced pop-up window.

S3022: displaying the prompt information of the system message in a resident floating layer mode on the merchant platform application if the system message is a second important level information.

In the embodiment of the present disclosure, through a resident floating layer mode, the system message is displayed to the merchant in a relatively strengthened interactive manner to achieve the effect of the more important information is reminded in a generally intensity.

The system message is the second important level information, which is the more important level information, and refers to a system message related to main business links of the store (such as orders, products, after-sales, etc.), and a solution to help the merchant solve management problems is provided in the content of the system message.

The resident floating layer may be a fixed floating window displayed at a preset position of the merchant platform application.

The preset position may be any positions in the merchant platform application, such as a blank area in the upper right corner of the merchant platform application. Reference to FIG. 4, which is a schematic diagram of resident floating layer display of a system message provided by an embodiment of the present disclosure. As shown in FIG. 4, a part of the system message, an operation entry, and a close button may be displayed on the resident floating layer.

S3023: displaying the prompt information of the system message in a temporary floating layer mode on the merchant platform application if the system message is a third important level information.

The temporary floating layer may be a temporary floating window, and the temporary floating layer may automatically close after a preset time. For example, it automatically closes after 3 seconds.

In the embodiment of the present disclosure, the system message is displayed to the merchant through an interactive manner of the temporary floating layer, achieving the effect of reminding the merchant weakeningly.

The system message is the third important level information, which is the emergency level information, and refers to a system message related to main business links of the store (such as orders, products, after-sales, etc.), but the content of the system message is only a notification and does not include the problem solving solution. The temporary floating layer may be a non-fixed floating window displayed at a preset position of the merchant platform application.

Figure 5:
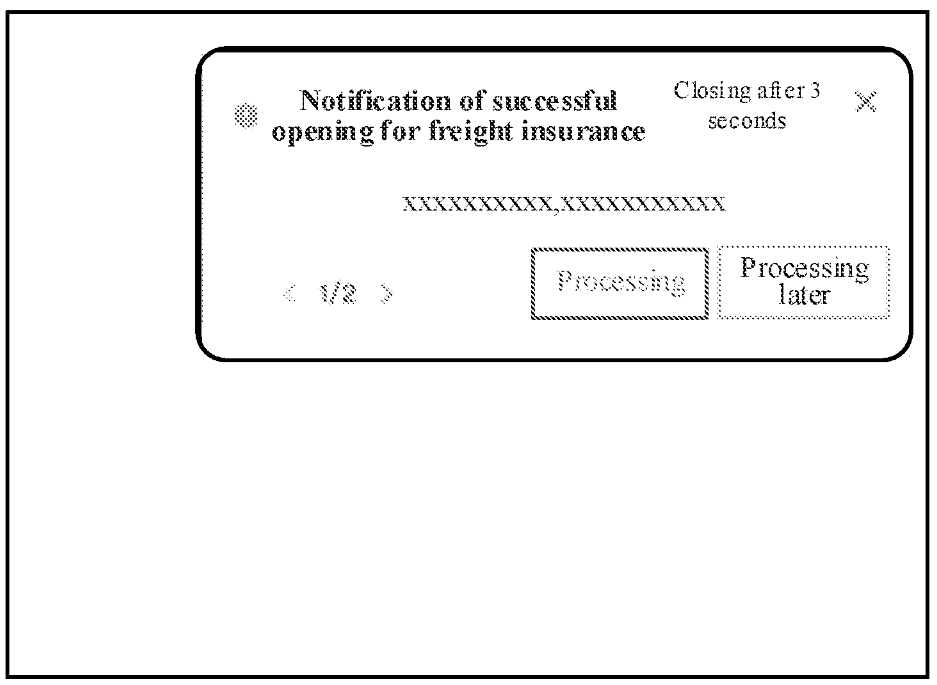
FIG. 5 is a schematic diagram of temporary floating layer display of a system message provided by an embodiment of the present disclosure.

The preset position may be any positions in the merchant platform application, such as a blank area in the upper right corner of the merchant platform application. Reference to FIG. 5, which is a schematic diagram of temporary floating layer display of a system message provided by an embodiment of the present disclosure. As shown in FIG. 5, a part of the system message, an operation entry, and a close button may be displayed on the temporary floating layer.

It should be noted that: when both the second important level information and the third important level information are received, the resident floating layer corresponding to the second important level information is displayed priority.

S3024: saving the system message in a preset message control of the merchant platform application if the system message is a fourth important level information, where the preset message control is used to display the system message in a window list mode in response to a triggering operation of the merchant in the preset message control.

The system message is the fourth important level information, which is the ordinary level information, and refers to a platform business promotion unrelated to main business links of the store (such as orders, products, after-sales, etc.).

In the present embodiment, when the system message is the fourth important level information, neither the system message nor the prompt information of the system message are displayed, and the merchant is not reminded in any form. The merchant may access the preset message control to view the system message without any impact on the merchant business.

Figure 6:
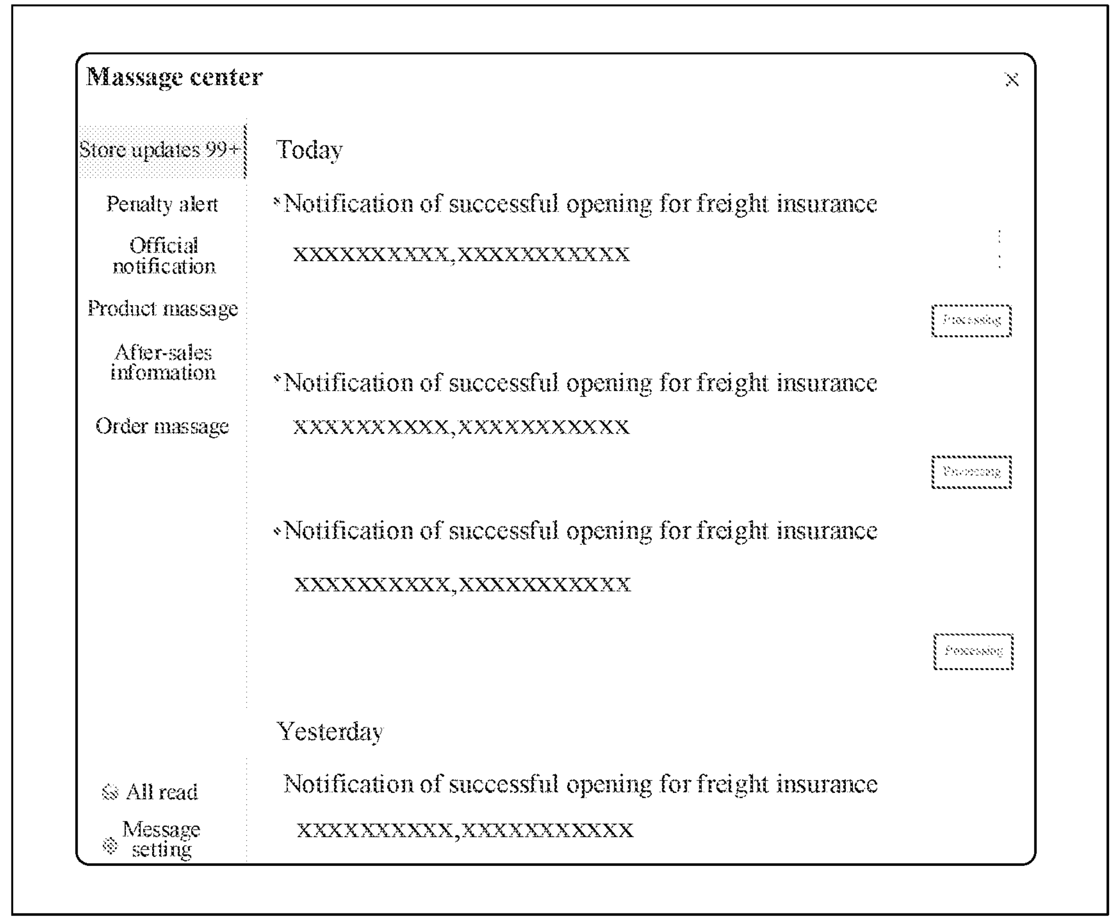
FIG. 6 is a schematic diagram of displaying a system message in a message center provided by an embodiment of the present disclosure.

In the present embodiment, the preset message control is the "message center" of the merchant platform application. Referring to FIG. 6, which is a schematic diagram of displaying a system message in a message center provided by an embodiment of the present disclosure.

In an embodiment of the present disclosure, displaying a processing page of the system message in response to a triggering operation of the merchant for the prompt information of the system message. Referring to FIGS. 3-6, clicking the "Processing" button by the merchant to switch to a corresponding processing page of the system message.

It can be seen from the above description that, in accordance with the importance level of the system message, the forced pop-up window, the resident floating layer, the temporary floating layer, and no reminders are adopted to display to the merchant in a strong to weak interactive reminding mode, important information is emphatically reminded, non-important information is reminded in a lower intensity or not be reminded, improving the experience of the merchant for receiving the system message.

Figure 7:
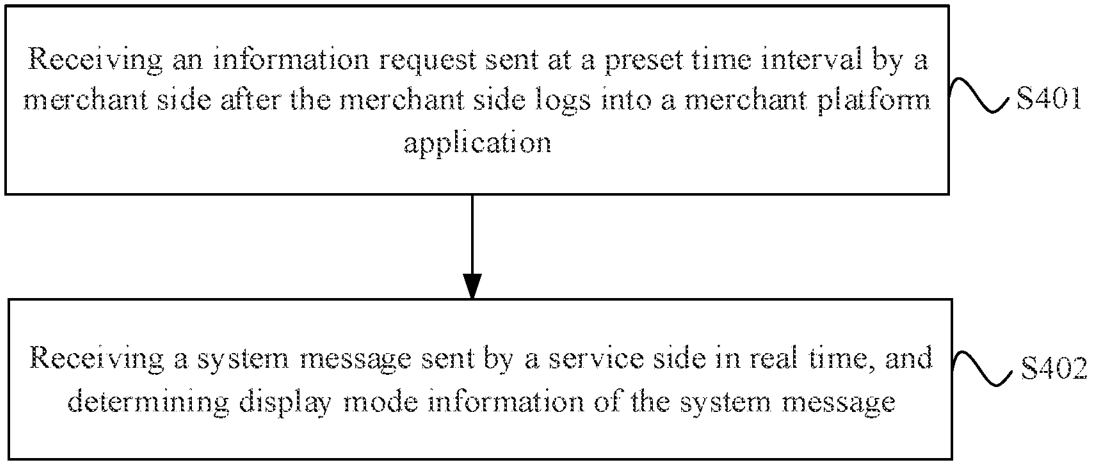
FIG. 7 is a second flow schematic diagram of an information processing method provided by an embodiment of the present disclosure.

Reference to FIG. 7, which is a second flow schematic diagram of an information processing method provided by an embodiment of the present disclosure. The method of this embodiment can be applied to the platform side shown in FIG. 1, the information processing method includes the following steps.

S401: receiving an information request sent at a preset time interval by a merchant side after the merchant side logs into a merchant platform application.

S402: receiving a system message sent by a service side in real time, and determining display mode information of the system message.

In an embodiment of the present disclosure, the system messages may be divided into two types: one type is a broadcast message targeting all merchants, and another type is the merchant message for a designated merchant.

For the broadcast message targeting all merchants, the receiving the system message sent by the service side in real time includes: receiving the broadcast message sent by the service side through a first message synchronization model in response to a preset triggering operation of the merchant in the merchant platform application, where the first message synchronization model is a pull message model.

The preset triggering operation of the merchant in the merchant platform application may be an operation that clicking and accessing the "message center" of the merchant platform application mentioned above, or an operation that the merchant logs in on the merchant platform application, and other operations.

For the merchant message of the designated merchant, the receiving the system message sent by the service side in real time includes: receiving the merchant message sent by the service side through a second message synchronization model, where the second message synchronization model is an active push message model.

It should be noted that the first message synchronization model is a PULL message model, and the second message synchronization model is a PUSH message model.

S403: sending the system message to the merchant side in response to the information request, where the system message includes the display mode information to enable the merchant side to display the system message and/or prompt information of the system message on the merchant platform application according to the display mode information.

It can be seen from the above description that that receiving an information request sent at a preset time interval by a merchant side after the merchant side logs into a merchant platform application; receiving a system message sent by a service side in real time, and determining display mode information of the system message; and sending the system message to the merchant side in response to the information request, where the system message includes the display mode information to enable the merchant side to display the system message and/or prompt information of the system message on the merchant platform application according to the display mode information. This embodiment does not require the merchant to obtain a new system message by refreshing a page, avoiding a repeated refresh operation by the merchant and avoiding the merchant missing an important notification due to not being able to obtain the system message in time.

In one embodiment of the present disclosure, on the basis of the above embodiment, in step S402 above, the determining the display mode information of the system message, specifically includes:

S4021: identifying a content type label contained in the system message.

In the embodiment of the present disclosure, if the system message is a system message related to blocking store operations of the merchant (such as contract signing) and major business activities within the company (such as the New Year's Goods Festival), a content type label contained in the system message is marked as a first content type label.

If the system message is a system message related to main business links of the store (such as orders, products, after-sales, etc.), and a solution to help the merchant solve management problems is provided in the content of the system message, a content type label contained in the system message is marked as a second content type label.

If the system message is a system message related to main business links of the store (such as orders, products, after-sales, etc.), but the content of the system message is only a notification and does not include a problem solving solution, a content type label contained in the system message is marked as a third content type label.

If the system message is a platform business promotion unrelated to main business links of the store (such as orders, products, after-sales, etc.), a content type label contained in the system message is marked as a fourth content type label.

S4022: determining the display mode information of the system message according to the content type label.

Specifically, determining importance level information of the system message according to the content type label; and determining the display mode information of the system message according to the importance level information of the system message.

In the embodiment of the present disclosure, the importance level information corresponding to the first content type label is the first important level information, and the corresponding display mode information is a forced pop-up window mode.

The importance level information corresponding to the second content type label is the second important level information, and the corresponding display mode information is a resident floating layer mode.

The importance level information corresponding to the third content type label is the third important level information, and the corresponding display mode information is a temporary floating layer mode.

The importance level information corresponding to the fourth content type label is the fourth important level information, and the corresponding display mode information is to save the system message in a preset message control, where the preset message control is used to display the system message in a window list mode in response to a triggering operation of the merchant in the preset message control.

It can be seen from the above description that the display mode of the system message may be accurately determined through the label for the content type of the system message.

Figure 8:
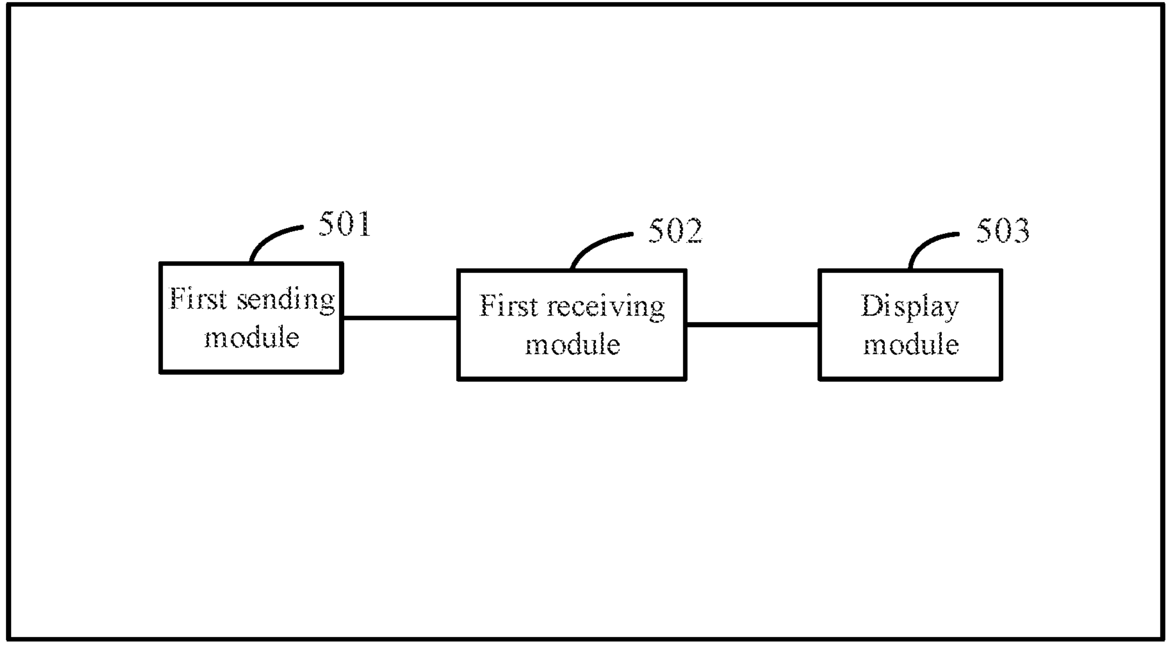
FIG. 8 is a first structural block diagram of an information processing apparatus provided by an embodiment of the present disclosure.

Corresponding to the information processing method of the aforementioned embodiment, FIG. 8 is a first structural block diagram of an information processing apparatus provided by an embodiment of the present disclosure. For ease of explanation, only the parts related to the disclosed embodiments are shown. Referring to FIG. 8, the apparatus includes a first sending module 501, a first receiving module 502, and a display module 503.

The first sending module 501 is configured to send an information request to a platform side at a preset time interval if it is determined that a merchant platform application has been logged in;

the first receiving module 502 is configured to receive a system message sent by the platform side in response to the information request in real time, where the system message is sent by a service side to the platform side in real time; and the display module 503 is configured to display the system message and/or prompt information of the system message on the merchant platform application.

In one or more embodiments of the present disclosure, the system message includes display mode information; the display module 503 is specifically configured to display the system message and/or prompt information of the system message on the merchant platform application according to the display mode information.

In one or more embodiments of the present disclosure, the display mode information is importance level information of the system message, and the importance level information is determined according to a content type of the system message; the display module 503 is specifically configured to identify the importance level information of the system message, and determine a display mode corresponding to the importance level information of the system message; and display the system message and/or the prompt information of the system message in the display mode corresponding to the importance level information of the system message.

In one or more embodiments of the present disclosure, the display module 503 is specifically configured to display the prompt information of the system message in a forced pop-up window mode on the merchant platform application if the system message is a first important level information; display the prompt information of the system message in a resident floating layer mode on the merchant platform application if the system message is a second important level information; display the prompt information of the system message in a temporary floating layer mode on the merchant platform application if the system message is a third important level information; and save the system message in a preset message control of the merchant platform application if the system message is a fourth important level information, where the preset message control is used to display the system message in a window list mode in response to a triggering operation of the merchant in the preset message control.

In one or more embodiments of the present disclosure, the apparatus further includes: a processing module 504, configured to display a processing page of the system message in response to a triggering operation of the merchant for the prompt information of the system message.

The device provided in the embodiment may be used to execute the technical solution of the above method embodiment, and the implementation principles and technical effects therebetween are similar, which will not be repeated in this embodiment.

Figure 9:
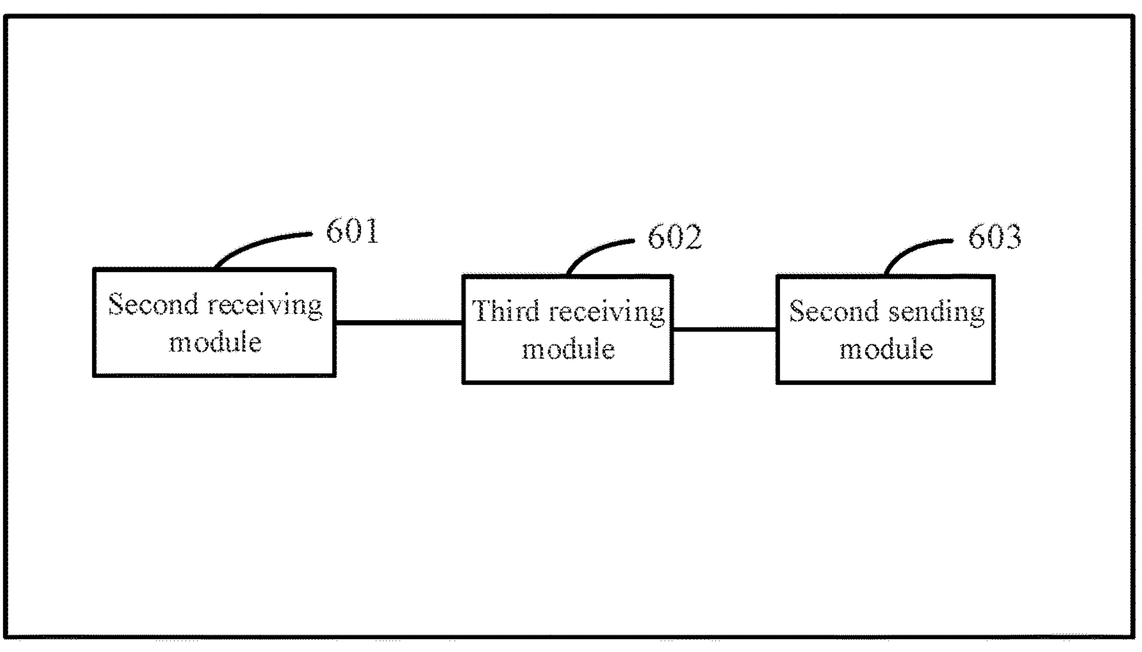
FIG. 9 is a second structural block diagram of an information processing apparatus provided by an embodiment of the present disclosure.

Corresponding to the information processing method of the aforementioned embodiment, FIG. 9 is a second structural block diagram of an information processing apparatus provided by an embodiment of the present disclosure. For ease of explanation, only the parts related to the disclosed embodiments are shown. Referring to FIG. 9, the apparatus includes a second receiving module 601, a third receiving module 602, and a second sending module 603.

The second receiving module 601 is configured to receive an information request sent at a preset time interval by a merchant side after the merchant side logs into a merchant platform application;

the third receiving module 602 is configured to receive a system message sent by a service side in real time, and determine display mode information of the system message; and the second sending module 603 is configured to send the system message to the merchant side in response to the information request, where the system message includes the display mode information to enable the merchant side to display the system message and/or prompt information of the system message on the merchant platform application according to the display mode information.

In one or more embodiments of the present disclosure, the third receiving module 602 is specifically configured to identify a content type label contained in the system message; and determine the display mode information of the system message according to the content type label.

In one or more embodiments of the present disclosure, the third receiving module 602 is specifically configured to determine importance level information of the system message according to the content type label; and determine the display mode information of the system message according to the importance level information of the system message.

In one or more embodiments of the present disclosure, the system message is a broadcast message targeting all merchants; the third receiving module 602 is specifically configured to receive the broadcast message sent by the service side through a first message synchronization model in response to a preset triggering operation of the merchant in the merchant platform application, where the first message synchronization model is a pull message model.

In one or more embodiments of the present disclosure, the system message is a merchant message for a designated merchant; the third receiving module 602 is specifically configured to receive the merchant message sent by the service side through a second message synchronization model, where the second message synchronization model is an active push message model.

The device provided in this embodiment may be used to execute the technical solution of the above method embodiment, and the implementation principles and technical effects therebetween are similar, this embodiment will not be repeated here.

In order to implement the above embodiments, the embodiment of the present disclosure also provides an electronic device.

Figure 10:
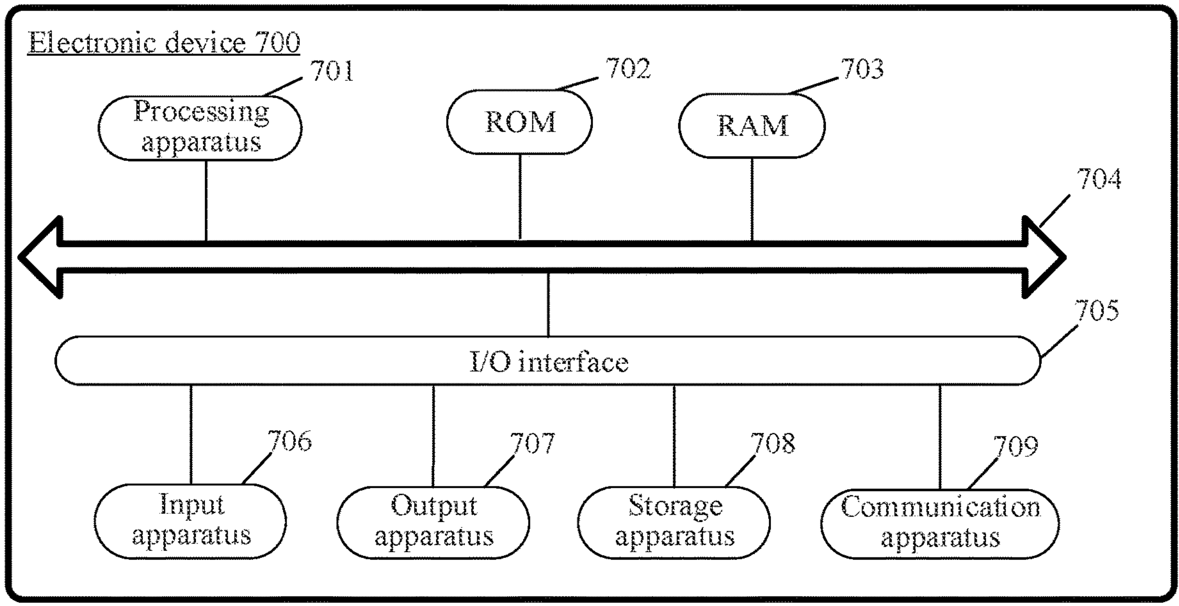
FIG. 10 is a structural schematic diagram of an electronic device provided by an embodiment of the present disclosure.

Referring to FIG. 10, which illustrates a structural schematic diagram of an electronic device 700 suitable for implementing an embodiment of the present disclosure, the electronic device 700 may be a terminal device or a server. The terminal device may include but are not limited to mobile terminals such as a mobile phone, a laptop, a digital broadcast receiver, a personal digital assistant (PDA), a portable Android device (PAD), a portable media player (PMP), a vehicle terminal (such as a vehicle navigation terminal), etc., and fixed terminals such as a digital TV, a desktop computer, etc. The electronic device shown in FIG. 10 is only an example, and there should be no limitations on the function and scope of use of the embodiments of the present disclosure.

As shown in FIG. 10, the electronic device 700 may include a processing apparatus 701 (such as a central processing unit, a graphics processing unit, etc.), which may perform various appropriate actions and processing according to a computer program stored in a read-only memory (ROM) 702 or a computer program loaded into a random access memory (RAM) 703 from a storage apparatus 708. Various programs and data required for the operation of the electronic device 700 may also be stored in the RAM 703. The processing apparatus 701, the ROM 702, and the RAM 703 are connected to each other through a bus 704. An input/output (I/O) interface 705 is also connected to the bus 704.

In general, the following apparatus may be connected to the I/O interface 705, including: an input apparatus 706, such as a touchscreen, a touchpad, a keyboard, a mouse, a camera, a microphone, an accelerometer, a gyrometer, etc.; an output apparatus 707, such as a liquid crystal display (LCD), a speaker, a shaker, etc.; a storage apparatus 708, such as a magnetic disk, a hard disk, etc.; and a communication apparatus 709. The communication apparatus 709 allows the electronic device 700 to exchange data with other devices through a wireless or wire communication. Although FIG. 10 shows the electronic device 700 with various devices, it should be understood that it is not required to implement or provide all the apparatus shown. More or fewer apparatus may alternatively be implemented or provided.

In particular, according to the embodiment of the present disclosure, the process described above with reference to the flowchart may be implemented as a computer software program. For example, embodiments of the present disclosure include a computer program product, which includes a computer program loaded on a computer readable medium, and the computer program includes program code for executing the method shown in a flowchart. In such an embodiment, the computer program may be downloaded and installed from the network through the communication apparatus 709, or installed from the storage apparatus 708, or installed from the ROM 702. When the computer program is executed by the processing apparatus 701, the above functions defined in the method of the embodiment of the present disclosure are executed.

It should be noted that the computer readable medium described in the present disclosure may be a computer readable signal medium, a computer readable storage medium, or any combination of the above two. The computer readable storage medium may be, for example, but not limited to, an electrical, magnetic, optical, electromagnetic, infrared, or semiconductor system, apparatus, or device, or any combination of the foregoing. More specific examples of the computer readable storage medium may include, but are not limited to: an electrical connection with one or more wires, a portable computer disk, a hard disk, a random access memory (RAM), a read-only memory (ROM), an erasable programmable read only memory (EPROM or flash memory), a fiber optic, a portable compact disk read-only memory (CD-ROM), an optical storage device, a magnetic storage device, or any suitable combination of the foregoing. In the present disclosure, a computer readable storage medium may be any tangible medium containing or storing a program, which may be used by or in combination with an instruction execution system, apparatus, or device. And in the present disclosure, the computer readable signal medium may include data signals transmitted in the baseband or as part of the carrier, in which computer readable program code is carried. Such transmitted data signals may take various forms, including but not limited to electromagnetic signals, optical signals or any suitable combination of the above. The computer readable signal medium may also be any computer readable medium other than the computer readable storage medium, which may transmit, propagate, or transmit programs for use by or in combination with an instruction execution system, apparatus, or device. The program code contained on the computer readable medium may be transmitted using any suitable medium, including an electrical wire, an optical fiber cable, radio frequency (RF), etc., or any suitable combination of the foregoing.

The above computer readable medium may be embodied in the above electronic device; and may also exist alone without being assembled into the electronic device.

The above computer readable medium carries one or more programs which, when executed by the electronic device, enables the electronic device to execute the method illustrated in the above embodiments.

The computer program code for implementing operations in the embodiments of the present disclosure may be written in one or more programming languages or the combination thereof, including object-oriented programming languages—such as Java, Smalltalk, C++, and conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or server. In the scenario involving the remote computer, the remote computer may be connected to the user's computer through any type of network, including a local area network (LAN) or a wide area network (WAN), or the connection may be made to an external computer (for example, through the Internet using an Internet Service Provider).

The flowcharts and block diagrams in the accompanying drawings illustrate the architecture, functionality, and operations of possible implementations of systems, methods, and computer program products according to various embodiments of the present disclosure. In this regard, each block in the flowchart or block diagrams may represent a module, a program segment, or a portion of code, which includes one or more executable instructions for implementing the specified logical functions. It should also be noted that, in some alternative implementations, the functions noted in the blocks may occur out of the order noted in the drawing. For example, two blocks shown in succession may, in fact, be executed substantially in parallel, or the blocks may also sometimes be executed in the reverse order, depending on the functions involved. It is also noted that each block in the block diagrams and/or flowcharts, and a combination of the blocks may be implemented by a dedicated hardware-based system for performing specified functions or operations, or by a combination of dedicated hardware and computer instructions.

The involved units described in the embodiments of the present disclosure may be implemented in a software manner, and may also be implemented in a hardware manner. The name of the unit does not constitute a limitation of the unit itself in some cases, for example, a first obtaining unit may also be described as "obtaining a unit of at least two IP addresses".

The functions described in the embodiments of the present disclosure may be executed, at least in part, by one or more hardware logic components. For example, unrestrictedly, exemplary types of hardware logic components that may be used include: a field-programmable gate array (FPGA), an application specific integrated circuit (ASIC), an application specific standard product (ASSP), a system on chip (SOC), a complex programmable logic device (CPLD) and so on.

In the context of the present disclosure, a machine readable medium may be a tangible medium that may contain or store a program for use by or in combination with an instruction execution system, apparatus, or device. The machine readable medium may be a machine readable signal medium or a machine readable storage medium. The machine readable storage media may include, but is not limited to an electrical, magnetic, optical, electromagnetic, infrared, or semiconductor system, apparatus, or device, or any suitable combination of the foregoing. More specific examples of the machine readable storage medium may include an electrical connection with one or more wires, a portable computer disk, a hard disk, a random access memory (RAM), a read-only memory (ROM), an erasable programmable read only memory (EPROM or a flash memory), a fiber optic, a portable compact disk read-only memory (CD-ROM), an optical storage device, a magnetic storage device, or any suitable combination of the foregoing.

In a first aspect, an embodiment of the present disclosure provides an information processing method, including:

- sending an information request to a platform side at a preset time interval if it is determined that a merchant platform application has been logged in;
- receiving a system message sent by the platform side in response to the information request in real time, where the system message is sent by a service side to the platform side in real time; and
- displaying the system message and/or prompt information of the system message on the merchant platform application.

In one or more embodiments of the present disclosure, the system message includes display mode information;

- the displaying the system message and/or the prompt information of the system message on the merchant platform application includes: displaying, according to the display mode information, the system message and/or the prompt information of the system message on the merchant platform application.

In one or more embodiments of the present disclosure, the display mode information is importance level information of the system message, and the importance level information is determined according to a content type of the system message; the displaying, according to the display mode information, the system message and/or the prompt information of the system message on the merchant platform application includes: identifying the importance level information of the system message, and determining a display mode corresponding to the importance level information of the system message; and displaying the system message and/or the prompt information of the system message in the display mode corresponding to the importance level information of the system message.

In one or more embodiments of the present disclosure, the displaying the system message and/or the prompt information of the system message in the display mode corresponding to the importance level information of the system message includes: displaying the prompt information of the system message in a forced pop-up window mode on the merchant platform application if the system message is a first important level information; displaying the prompt information of the system message in a resident floating layer mode on the merchant platform application if the system message is a second important level information; displaying the prompt information of the system message in a temporary floating layer mode on the merchant platform application if the system message is a third important level information; and saving the system message in a preset message control of the merchant platform application if the system message is a fourth important level information, where the preset message control is used to display the system message in a window list mode in response to a triggering operation of the merchant in the preset message control.

In one or more embodiments of the present disclosure, the information processing method further includes: displaying a processing page of the system message in response to a triggering operation of the merchant for the prompt information of the system message.

In a second aspect, an embodiment of the present disclosure provides an information processing method, including:

receiving an information request sent at a preset time interval by a merchant side after the merchant side logs into a merchant platform application;

receiving a system message sent by a service side in real time, and determining display mode information of the system message; and sending the system message to the merchant side in response to the information request, where the system message includes the display mode information to enable the merchant side to display the system message and/or prompt information of the system message on the merchant platform application according to the display mode information.

In one or more embodiments of the present disclosure, the determining the display mode information of the system message includes: identifying a content type label contained in the system message; and determining the display mode information of the system message according to the content type label.

In one or more embodiments of the present disclosure, the determining the display mode information of the system message according to the content type label includes: determining importance level information of the system message according to the content type label; and determining the display mode information of the system message according to the importance level information of the system message.

In one or more embodiments of the present disclosure, the system message is a broadcast message targeting all merchants; the receiving the system message sent by the service side in real time includes: receiving the broadcast message sent by the service side through a first message synchronization model in response to a preset triggering operation of the merchant in the merchant platform application, where the first message synchronization model is a pull message model.

In one or more embodiments of the present disclosure, the system message is a merchant message for a designated merchant; the receiving the merchant message sent by the service side in real time includes: receiving the broadcast message sent by the service side through a second message synchronization model, where the second message synchronization model is an active push message model.

In a third aspect, an embodiment of the present disclosure provides an information processing apparatus, including:

a first sending module, configured to send an information request to a platform side at a preset time interval if it is determined that a merchant platform application has been logged in;

a first receiving module, configured to receive a system message sent by the platform side in response to the information request in real time, where the system message is sent by a service side to the platform side in real time; and a display module, configured to display the system message and/or prompt information of the system message on the merchant platform application.

In one or more embodiments of the present disclosure, the system message includes display mode information; the display module is specifically configured to display, according to the display mode information, the system message and/or the prompt information of the system message on the merchant platform application.

In one or more embodiments of the present disclosure, the display mode information is importance level information of the system message, and the importance level information is determined according to a content type of the system message; the display module is specifically configured to identify the importance level information of the system message, and determine a display mode corresponding to the importance level information of the system message; and display the system message and/or the prompt information of the system message in the display mode corresponding to the importance level information of the system message.

In one or more embodiments of the present disclosure, the display module is specifically configured to display the prompt information of the system message in a forced pop-up window mode on the merchant platform application if the system message is a first important level information; display the prompt information of the system message in a resident floating layer mode on the merchant platform application if the system message is a second important level information; display the prompt information of the system message in a temporary floating layer mode on the merchant platform application if the system message is a third important level information; and save the system message in a preset message control of the merchant platform application if the system message is a fourth important level information, where the preset message control is used to display the system message in a window list mode in response to a triggering operation of the merchant in the preset message control.

In one or more embodiments of the present disclosure, the apparatus further including: a processing module, configured to display a processing page of the system message in response to a triggering operation of the merchant for the prompt information of the system message.

In a fourth aspect, an embodiment of the present disclosure provides an information processing apparatus, including:

a second receiving module, configured to receive an information request sent at a preset time interval by a merchant side after the merchant side logs into a merchant platform application;

a third receiving module, configured to receive a system message sent by a service side in real time, and determine display mode information of the system message; and a second sending module, configured to send the system message to the merchant side in response to the information request, where the system message includes the display mode information to enable the merchant side to display the system message and/or prompt information of the system message on the merchant platform application according to the display mode information.

In one or more embodiments of the present disclosure, the third receiving module is specifically configured to identify a content type label contained in the system message; and determine the display mode information of the system message according to the content type label.

In one or more embodiments of the present disclosure, the third receiving module is specifically configured to determine importance level information of the system message according to the content type label; and determine the display mode information of the system message according to the importance level information of the system message.

In one or more embodiments of the present disclosure, the system message is a broadcast message targeting all merchants; the third receiving module is specifically configured to receive the broadcast message sent by the service side through a first message synchronization model in response to a preset triggering operation of the merchant in the merchant platform application, where the first message synchronization model is a pull message model.

In one or more embodiments of the present disclosure, the system message is a merchant message for a designated merchant; the third receiving module is specifically configured to receive the merchant message sent by the service side through a second message synchronization model, where the second message synchronization model is an active push message model.

In a fifth aspect, an embodiment of the present disclosure provides an electronic device, including: a processor and a memory;

where the memory has a computer-executable instruction stored therein;

the processor executes the computer-executable instruction stored in the memory to enable the at least one processor to perform the information processing method described in the first aspect above.

In a sixth aspect, an embodiment of the present disclosure provides an electronic device, including: a processor and a memory;

where the memory has a computer-executable instruction stored therein;

the processor executes the computer-executable instruction stored in the memory to enable the at least one processor to perform the information processing method described in the second aspect above.

In a seventh aspect, an embodiment of the present disclosure provides a computer readable storage medium storing a computer-executable instruction, when the computer-executable instruction is executed by a processor, the information processing method described in the first aspect above is implemented.

In an eighth aspect, an embodiment of the present disclosure provides a computer readable storage medium storing a computer-executable instruction, when the computer-executable instruction is executed by a processor, the information processing method described in the second aspect above is implemented.

In a ninth aspect, an embodiment of the present disclosure provides a computer program product including a computer program, when the computer program is executed by a processor, the information processing method described in the first aspect above is implemented.

In a tenth aspect, an embodiment of the present disclosure provides a computer program product including a computer program, when the computer program is executed by a processor, the information processing method described in the second aspect above is implemented.

In an eleventh aspect, an embodiment of the present disclosure provides a computer program, when the computer program is executed by a processor, the information processing method described in the first aspect above is implemented.

In a twelfth aspect, an embodiment of the present disclosure provides a computer program, when the computer program is executed by a processor, the information processing method described in the second aspect above is implemented.

The above description is merely better embodiments of the present disclosure and explanations of the technical principles employed. Those skilled in the art should understand that the scope of disclosure involved in the present disclosure is not limited to the technical solutions formed by the specific combination of the above technical features, and should also cover, without departing from the above disclosed concept, other technical solutions formed by any combination of the above technical features or their equivalent features. For example, a technical solution formed by replacing the above features with technical features that have similar functions to those disclosed in the present disclosure (but not limited to).

Additionally, although each operation is depicted in a particular order, which should not be understood as requiring that the operations should be performed in the particular order shown or in a sequential order. Multitask and parallel processing may be advantageous under certain circumstances. Likewise, although the above discussion contains several specific implementation details, those should not be construed as limitations on the scope of the present disclosure. Certain features described in the context of separate embodiments may also be implemented in combination in a single embodiment. Conversely, various features described in the context of a single embodiment may also be implemented in multiple embodiments separately or in any suitable sub-combination.

Although the subject matter has been described in language specific to structural features and/or method logic actions, it should be understood that the subject matter defined in the appended claims is not necessarily limited to the specific features or actions described above. Rather, the specific features and actions described above are merely example forms for implementing the claims.

What is claimed is:

1. An information processing method, comprising:

sending an information request to a platform side at a preset time interval if it is determined that a merchant platform application has been logged in, wherein the information request is configured to trigger a query of a system message by the platform side;

receiving the system message sent by the platform side in response to the information request in real time, wherein the system message is sent by a service side to the platform side in real time, and the system message is related to merchant operations, sales, and management; and displaying at least one of the system message or prompt information of the system message on the merchant platform application.

2. The method according to claim 1, wherein the system message comprises display mode information;

the displaying at least one of the system message or the prompt information of the system message on the merchant platform application comprises:

displaying, according to the display mode information, at least one of the system message or the prompt information of the system message on the merchant platform application.

3. The method according to claim 2, wherein the display mode information is importance level information of the system message, and the importance level information is determined according to a content type of the system message;

the displaying, according to the display mode information, at least one of the system message or the prompt information of the system message on the merchant platform application comprises:

identifying the importance level information of the system message, and determining a display mode corresponding to the importance level information of the system message; and displaying at least one of the system message or the prompt information of the system message in the display mode corresponding to the importance level information of the system message.

4. The method according to claim 3, wherein the displaying at least one of the system message or the prompt information of the system message in the display mode corresponding to the importance level information of the system message comprises:

displaying the prompt information of the system message in a forced pop-up window mode on the merchant platform application if the system message is a first important level information;

displaying the prompt information of the system message in a resident floating layer mode on the merchant platform application if the system message is a second important level information;

displaying the prompt information of the system message in a temporary floating layer mode on the merchant platform application if the system message is a third important level information; and saving the system message in a preset message control of the merchant platform application if the system message is a fourth important level information, wherein the preset message control is used to display the system message in a window list mode in response to a triggering operation of the merchant in the preset message control.

5. The method according to claim 1, further comprising:

displaying a processing page of the system message in response to a triggering operation of the merchant for the prompt information of the system message.

6. An information processing method, comprising:

receiving an information request sent at a preset time interval by a merchant side after the merchant side logs into a merchant platform application, wherein the information request is configured to trigger a query of a system message by a platform side;

receiving the system message sent by a service side in real time, and determining display mode information of the system message, and the system message is related to merchant operations, sales, and management; and sending the system message to the merchant side in response to the information request, wherein the system message comprises the display mode information to enable the merchant side to display at least one of the system message or prompt information of the system message on the merchant platform application according to the display mode information.

7. The method according to claim 6, wherein the determining the display mode information of the system message comprises:

identifying a content type label contained in the system message; and determining the display mode information of the system message according to the content type label.

8. The method according to claim 7, wherein the determining the display mode information of the system message according to the content type label comprises:

determining importance level information of the system message according to the content type label; and determining the display mode information of the system message according to the importance level information of the system message.

9. The method according to claim 6, wherein the system message is a broadcast message targeting all merchants;

the receiving the system message sent by the service side in real time comprises:

receiving the broadcast message sent by the service side through a first message synchronization model in response to a preset triggering operation of the merchant in the merchant platform application, wherein the first message synchronization model is a pull message model.

10. The method according to claim 6, wherein the system message is a merchant message for a designated merchant;

the receiving the system message sent by the service side in real time comprises:

receiving the merchant message sent by the service side through a second message synchronization model, wherein the second message synchronization model is an active push message model.

11. An information processing apparatus, comprising at least one processor and a memory;

wherein the memory has a computer-executable instruction stored therein;

the at least one processor executes the computer-executable instruction stored in the memory to enable the at least one processor to:

send an information request to a platform side at a preset time interval if it is determined that a merchant platform application has been logged in, wherein the information request is configured to trigger a query of a system message by the platform side;

receive the system message sent by the platform side in response to the information request in real time, wherein the system message is sent by a service side to the platform side in real time, and the system message is related to merchant operations, sales, and management; and display at least one of the system message or prompt information of the system message on the merchant platform application.

12. The apparatus according to claim 11, wherein the system message comprises display mode information;

the processor is further configured to:

display at least one of the system message or the prompt information of the system message on the merchant platform application according to the display mode information.

13. The apparatus according to claim 12, wherein the display mode information is importance level information of the system message, and the importance level information is determined according to a content type of the system message;

the processor is further configured to:

identify the importance level information of the system message, and determine a display mode corresponding to the importance level information of the system message; and display at least one of the system message or the prompt information of the system message in the display mode corresponding to the importance level information of the system message.

14. The apparatus according to claim 13, wherein the processor is further configured to:

display the prompt information of the system message in a forced pop-up window mode on the merchant platform application if the system message is a first important level information;

display the prompt information of the system message in a resident floating layer mode on the merchant platform application if the system message is a second important level information;

display the prompt information of the system message in a temporary floating layer mode on the merchant platform application if the system message is a third important level information; and save the system message in a preset message control of the merchant platform application if the system message is a fourth important level information, wherein the preset message control is used to display the system message in a window list mode in response to a triggering operation of the merchant in the preset message control.

15. The apparatus according to claim 11, the processor is further configured to:

display a processing page of the system message in response to a triggering operation of the merchant for the prompt information of the system message.

16. An information processing apparatus, comprising at least one processor and a memory;

wherein the memory has a computer-executable instruction stored therein;

the at least one processor executes the computer-executable instruction stored in the memory to enable the at least one processor to perform the information processing method according to claim 6.

17. The apparatus according to claim 16, the processor is further configured to perform the information processing method according to claim 7.

18. A non-transitory computer readable storage medium storing a computer-executable instruction, wherein when the computer-executable instruction is executed by a processor, the information processing method according to claim 1 is implemented.

19. A non-transitory computer readable storage medium storing a computer-executable instruction, wherein when the computer-executable instruction is executed by a processor, the information processing method according to claim 6 is implemented.

* * * * *